F. BRAMER.
Wheel-Harrow.
No. 8,299. Reissued June 25, 1878.
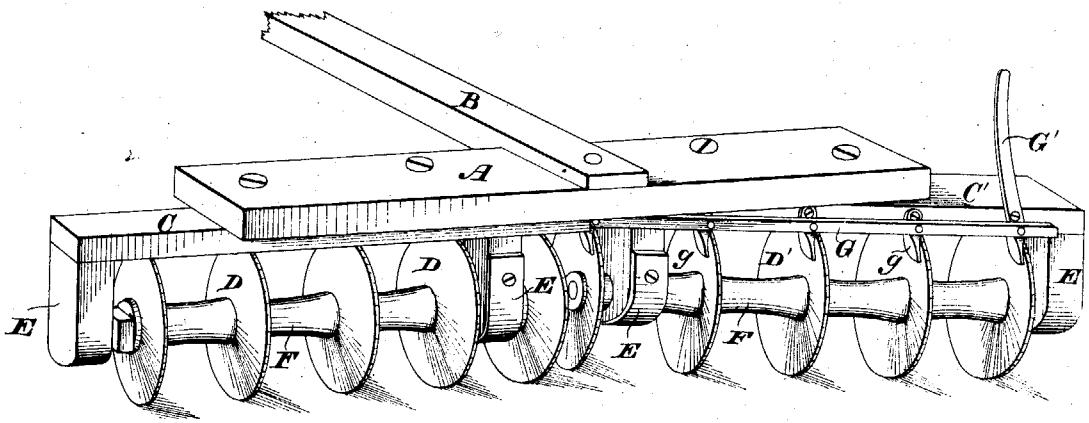
WITNESSES
Wm. A. Skinkle
Robordeau Buchanan.
By his Attorneys
Baldwin, Hopkins & Peyton
INVENTOR
Frank Bramer.

UNITED STATES PATENT OFFICE.

FRANK BRAMER, OF LITTLE FALLS, NEW YORK.

IMPROVEMENT IN WHEEL-HARROWS.

Specification forming part of Letters Patent No. 171,092, dated December 14, 1875; Reissue No. 8,299, dated June 25, 1878; application filed June 10, 1878.

*To all whom it may concern:*

Be it known that I, FRANK BRAMER, of Little Falls, in the county of Herkimer and State of New York, have invented certain new and useful Improvements in Wheel-Harrows, of which the following is a specification:

My invention relates to wheel-harrows of that class having a series of concavo-convex disks arranged in gangs and revolving upon or with a common axle mounted in suitable bearings in the gang-frames.

Its object is so to organize scrapers or clearers relatively to said disks that they can be made to approach the concave faces of the disks to remove clogging matter therefrom, and then be swung out of the way to prevent the accumulation of clogging matter upon them, or between them and the disks.

To these ends my improvements consist, first, in combining with the wheels or rotating concavo-convex disks of a wheel-harrow, or combined wheel-harrow and grain-drill, (in which said wheels are mounted and made adjustable in gangs,) a series of pivoted, rocking, or adjustable clearers or scrapers, united and made adjustable in gangs, and controlled by the driver in his seat while the machine is in operation for cleaning the disks or wheels, and thus increasing their efficiency; second, in combining with a wheel-gang or series of concavo-convex disks a series of pivoted, rocking, or adjustable clearers or scrapers (made adjustable in gangs) corresponding in number with the number of the disks in the gangs, and a lever pivoted on the gang-frame, whereby the scrapers may be caused simultaneously to approach or recede from the concave faces of the disks; third, in combining with a wheel-gang a series of rotating concavo-convex harrow-disks and a series of clearers or scrapers, (one to each disk,) united to a reciprocating bar, adapting them to be operated simultaneously by means of a lever, to cause them to approach or recede from the concave faces or sides of their respective disks.

The accompanying drawing represents a view, in perspective, of so much of a wheel-harrow or combined wheel-harrow and grain-drill or seeder as is necessary to illustrate the subject-matter herein claimed.

The main frame or main bar A of the machine consists, in the present instance, of a stout transverse beam or plank, with which a draft pole or tongue, B, a driver's seat, and gang-bars or frames C C′ are connected in any usual or proper manner. These gang-bars or frames, in practice, will be pivoted or hinged to the frame or frame-bar A, and be made adjustable in opposite directions relatively thereto, for the purpose of setting the disks or wheels at a greater or less angle to the path of the machine, according to the amount of drag action required.

The wheels D and D′ of the opposite gangs are set with opposing faces and at opposite angles, in such manner that the side draft or tendency to side movement by the wheels of one gang is opposed and counteracted by the wheels of the other gang.

The gang-bars C C′ are connected with the shafts of the wheels D D′ by pendent arms or brackets E, and the wheels and spacing-thimbles F are mounted on said shafts in any usual manner.

A series of pendent clearers or scrapers, *g g*, are pivoted to the rear of the gang-bars—one scraper to each disk. These scrapers are pivoted each to a horizontal sliding or adjustable bar, G, which, at one end, or at any convenient point in its length, is pivoted, linked, or connected to a lever, G′, in turn pivoted upon the gang-bar, the upper end of which lever is intended to be placed within convenient reach of the driver in his seat on the machine.

By moving the upper end of the lever in or out the scrapers can be moved into contact with the faces of the disks for freeing them from any adhering clogging or obstructing matter, or can be moved away from the same when the wheels are free from such obstructing matter, thus obviating the frictional resistance of such scrapers when not needed for clearing the wheels.

The operation of the apparatus will readily be understood from the foregoing description.

I am aware that forked scrapers have heretofore been independently hinged to a gang-bar in such manner as constantly to work close to or in contact with both sides of harrow-disks.

I am also aware that a hinged scraper controlled by a lever has been used to remove clogging matter from a land-roller, and therefore do not broadly claim the combination of a hinged or rocking scraper and a roller or disk; but, so far as I am aware, I am the first ever so to organize a series of pivoted or adjustable scrapers with a lever mounted on the gang-bar of a wheel-harrow that the driver could from his seat cause said scrapers to approach the faces or sides of the disks to remove clogging matter, and then remove them therefrom, leaving the disks free and clear.

Having now described my invention, what I claim as new, and desire to secure by Letters Patent, is—

1. The combination, substantially as hereinbefore set forth, of a series or gang of harrow-disks having concave faces or sides with a series of scrapers or clearers adapted to be vibrated or moved close to or in contact with said concave sides and removed therefrom while the machine is in motion.

2. The combination, substantially as hereinbefore set forth, of a series of rotating concavo-convex harrow-disks, a series of pivoted, rocking, or adjustable clearers or scrapers, connected together, and a lever pivoted on the gang-frame, whereby the scrapers may be caused simultaneously to approach or recede from the concave faces of the disks.

3. In combination with a gang or series of rotating harrow-disks, the clearers or scrapers united to a reciprocating bar, adapting them to be operated simultaneously by means of a lever, substantially as and for the purposes set forth.

4. The combination, substantially as hereinbefore set forth, of a draft-frame, a gang or series of rotating harrow-disks connected therewith, a series of scrapers united to a bar mounted upon the gang-bar or disk-frame and adapted to vibrate in contact with or close to the sides of the disks, and a lever pivoted upon said gang-bar, extending to within reach of the driver while in his seat on the machine, whereby the scrapers may simultaneously be caused to clear the sides of the disks, and then removed therefrom when the disks are free and clear, to prevent clogging by accumulation upon the scrapers.

FRANK BRAMER.

Witnesses:
G. G. CROWLEY,
SIDNEY A. LOOMIS.